United States Patent
Rivera Paredes et al.

(10) Patent No.: US 10,608,448 B2
(45) Date of Patent: Mar. 31, 2020

(54) POWER BANK SYSTEM FOR A MOTOR VEHICLE

(71) Applicant: FORD GLOBAL TECHNOLOGIES, LLC, Dearborn, MI (US)

(72) Inventors: Luis Pablo Rivera Paredes, Alvaro Obregon (MX); David Paul Marshman, Walnut, CA (US); Miguel Angel Ortiz Fragoso, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 718 days.

(21) Appl. No.: 14/887,894

(22) Filed: Oct. 20, 2015

(65) Prior Publication Data

US 2017/0110897 A1    Apr. 20, 2017

(51) Int. Cl.
*H02J 7/00*        (2006.01)
*B60R 11/02*       (2006.01)
*H02J 7/34*        (2006.01)

(52) U.S. Cl.
CPC ............ *H02J 7/0042* (2013.01); *B60R 11/02* (2013.01); *H02J 7/00* (2013.01); *H02J 7/342* (2020.01)

(58) Field of Classification Search
CPC . H02J 7/0042; H02J 7/0052; H02J 2007/0062
USPC ................. 320/104, 107, 113, 115
See application file for complete search history.

(56) References Cited

U.S. PATENT DOCUMENTS

| | | | |
|---|---|---|---|
| 8,988,040 B2 | 3/2015 | Levy et al. | |
| 2005/0116684 A1 | 6/2005 | Kim | |
| 2006/0277555 A1* | 12/2006 | Howard | B60R 11/0211 720/600 |
| 2007/0080663 A1 | 4/2007 | Obering | |
| 2013/0183562 A1* | 7/2013 | Workman | H01M 2/204 429/100 |
| 2014/0138419 A1 | 5/2014 | Minn et al. | |
| 2014/0152257 A1* | 6/2014 | Miller | H02J 7/0042 320/111 |

FOREIGN PATENT DOCUMENTS

| | | |
|---|---|---|
| CN | 103490454 A | 1/2014 |
| CN | 104113094 A | 10/2014 |

OTHER PUBLICATIONS

English machine translation of CN103490454A.
English machine translation of CN104113094A.

* cited by examiner

*Primary Examiner* — Edward Tso
*Assistant Examiner* — Aaron Piggush
(74) *Attorney, Agent, or Firm* — David Coppiellie; King & Schickli, PLLC

(57) ABSTRACT

A power bank system is provided for a motor vehicle. That power bank system includes a power bank charging module that is integrated into a body interior of the motor vehicle. The power bank charging module includes a dedicated receiver for a portable power bank. Further the power bank system includes a portable power bank that is displaceable between a charging position within the dedicated receiver and a mobile use position withdrawn from the dedicated receiver. Advantageously, the portable power bank may be utilized to power a portable electronic device of a user outside of the motor vehicle for an extended period of time.

20 Claims, 5 Drawing Sheets

POWER BANK SYSTEM FOR A MOTOR VEHICLE

TECHNICAL FIELD

This document relates generally to the motor vehicle equipment field and, more particularly, to a power bank system that maintains a mobile or portable power bank in a charged state for use outside the motor vehicle to power mobile electronic devices.

BACKGROUND

Portable electronic devices such as music players and cell phones are commonly utilized and relied upon by on-the-go individuals in today's society. Unfortunately, such devices only have a limited duration between charging and also take a substantial amount of time to charge.

As a consequence, while electronic devices may be charged in a motor vehicle utilizing a USB or other appropriate port, the travel time spent in the vehicle before reaching a desired destination may not be sufficient to provide the portable electronic device with the desired charge before the individual must leave the motor vehicle and go to the required outside-the-vehicle destination.

This document relates to a power bank system for a motor vehicle that includes a power bank charging module integrated into a body interior of the motor vehicle and a portable power bank that is displaceable between a charging position within a dedicated receiver of the power bank charging module and a mobile use position withdrawn from the receiver. Such a device ensures that the user will have sufficient power to drive the user's mobile electronic device for a much longer period of time. As such, the power bank system disclosed herein provides a number of benefits and advantages and represents a significant advance in the motor vehicle arts.

SUMMARY

In accordance with the benefits and advantages described herein, a power bank system is provided for a motor vehicle. That power bank system comprises a power bank charging module that is integrated into a body interior of the motor vehicle. The power bank charging module includes a dedicated receiver for a portable power bank. In addition, the power bank system includes a portable power bank that is displaceable between a charging position within the dedicated receiver of the power bank charging module and a mobile use position withdrawn from the dedicated receiver. Thus, the portable power bank provides a means for powering an electronic device of the user for mobile applications outside of the motor vehicle as desired.

The power bank charging module includes a charge coupling for charging the portable power bank when the portable power bank is held in the receiver. Thus, the power bank is always charged and at the ready to power the electronic device of the individual.

In one possible embodiment, the power bank charging module includes a spring loaded door for closing the dedicated receiver when the portable power bank is withdrawn from the dedicated receiver. In one possible embodiment, the power bank charging module includes a push-to-eject mechanism for injecting the portable power bank from the dedicated receiver.

The portable power bank includes a battery held in a housing. In one possible embodiment, the portable power bank also includes a USB interface at a first end of the housing and a power input at a second end of the housing. That power input may comprise a motor vehicle AC adapter and a micro USB interface for mobile power charging: that is, charging by other means outside of the motor vehicle.

In one possible embodiment the power bank charging module is held in a recess behind a trim panel of the motor vehicle. In one possible embodiment, that trim panel may be a part of the instrument panel of the motor vehicle. In another possible embodiment, that trim panel may be a part of the center console of the motor vehicle.

In accordance with an additional aspect, a method is provided of providing an auxiliary power source for a mobile electronic device. That method may be broadly described as comprising the steps of: (a) equipping a motor vehicle with a power bank charging module integrated into a body interior of the motor vehicle, (b) charging a portable power bank in a dedicated receiver of the power bank charging module, and (c) allowing the portable power bank to be withdrawn from the dedicated receiver and used outside the motor vehicle to power the mobile electronic device.

In one possible embodiment, the method further includes integrating the power bank charging module into an instrument panel in a motor vehicle. In another possible embodiment, the method includes integrating the power bank charging module into a center console of the motor vehicle.

In the following description, there is shown and described several preferred embodiments of the power bank system and the related method for providing an auxiliary power source for a mobile electronic device. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

Reference will now be made in detail to the present preferred embodiments of the power bank system, examples of which are illustrated in the accompanying drawing figures.

DETAILED DESCRIPTION

Reference is now made to FIGS. 1-5 illustrating the power bank system 10 that is the subject matter of this document.

As illustrated, the power bank system 10 includes a power bank charging module 12 that is integrated into a body interior, and more particularly, received in a recess 14 behind a trim panel 16. The trim panel 16 may comprise, for example, a portion of the instrument panel stack or a center console of the motor vehicle.

Figure 2:
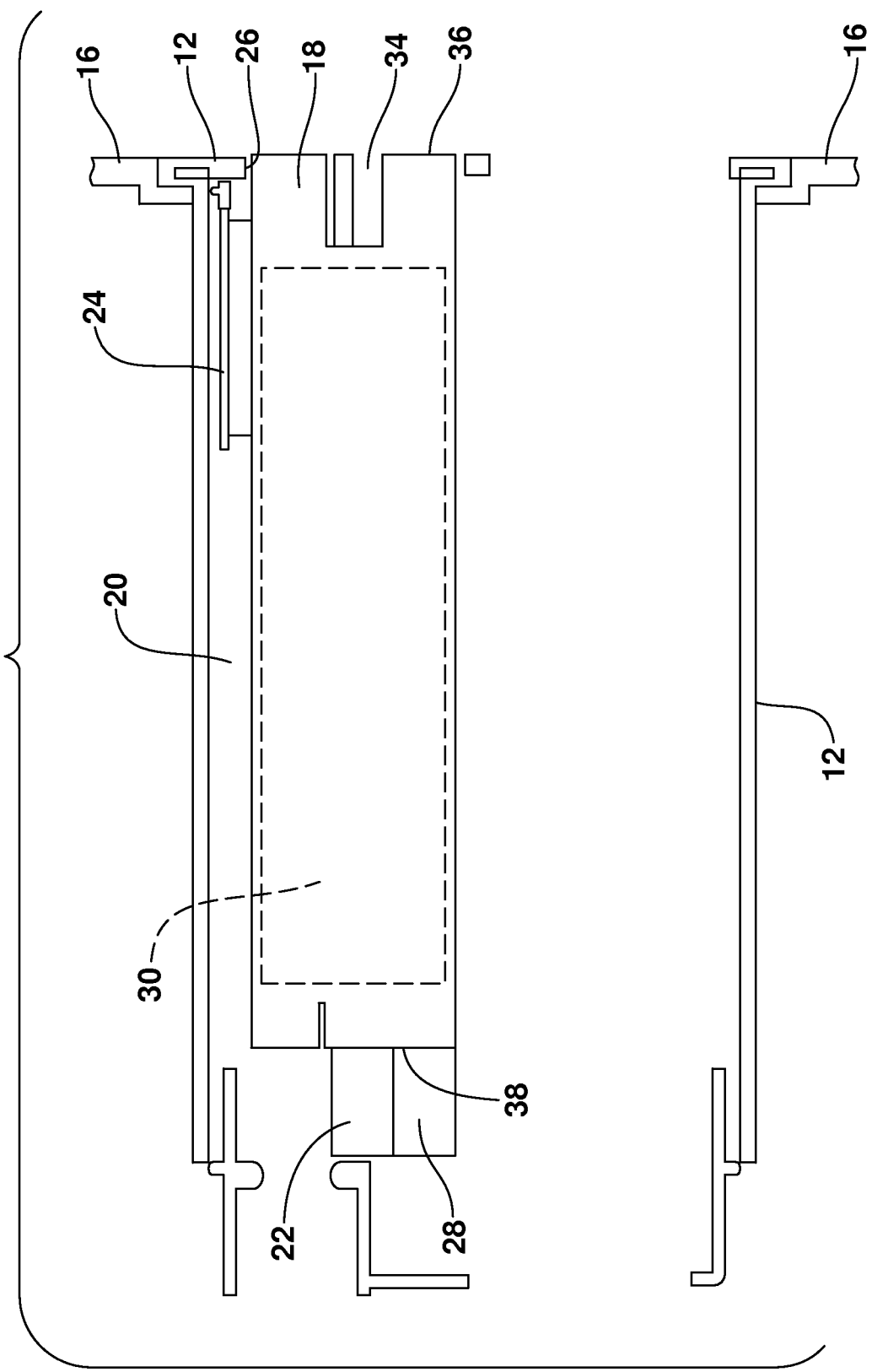
FIG. 2 is a schematic cross-sectional view illustrating the structure of FIG. 1.
Figure 3:
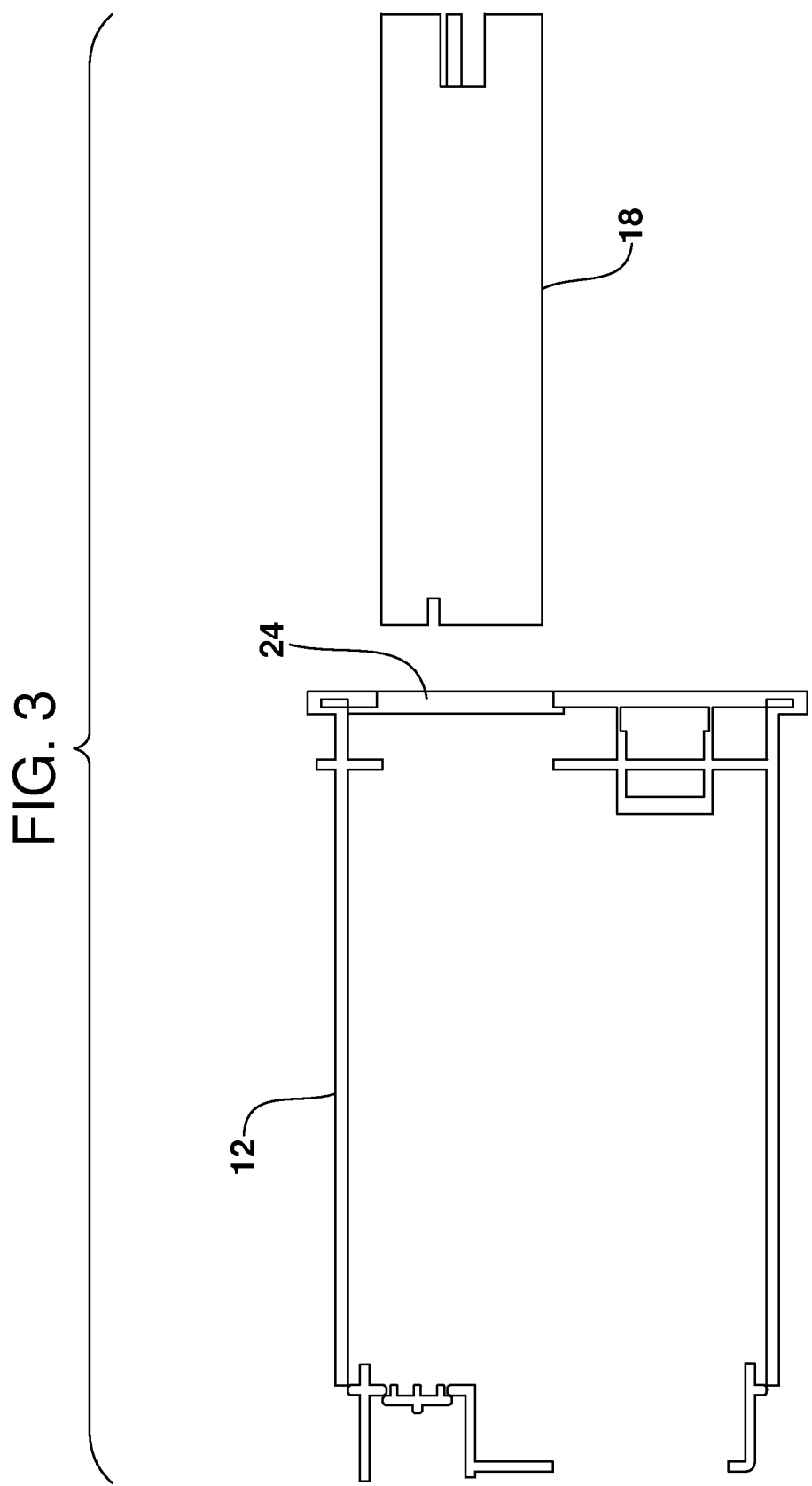
FIG. 3 is a schematic cross-sectional view of the structure of FIG. 1 but illustrating the portable power bank withdrawn from the dedicated receiver and the spring door of the dedicated receiver in the closed position.
Figure 4:
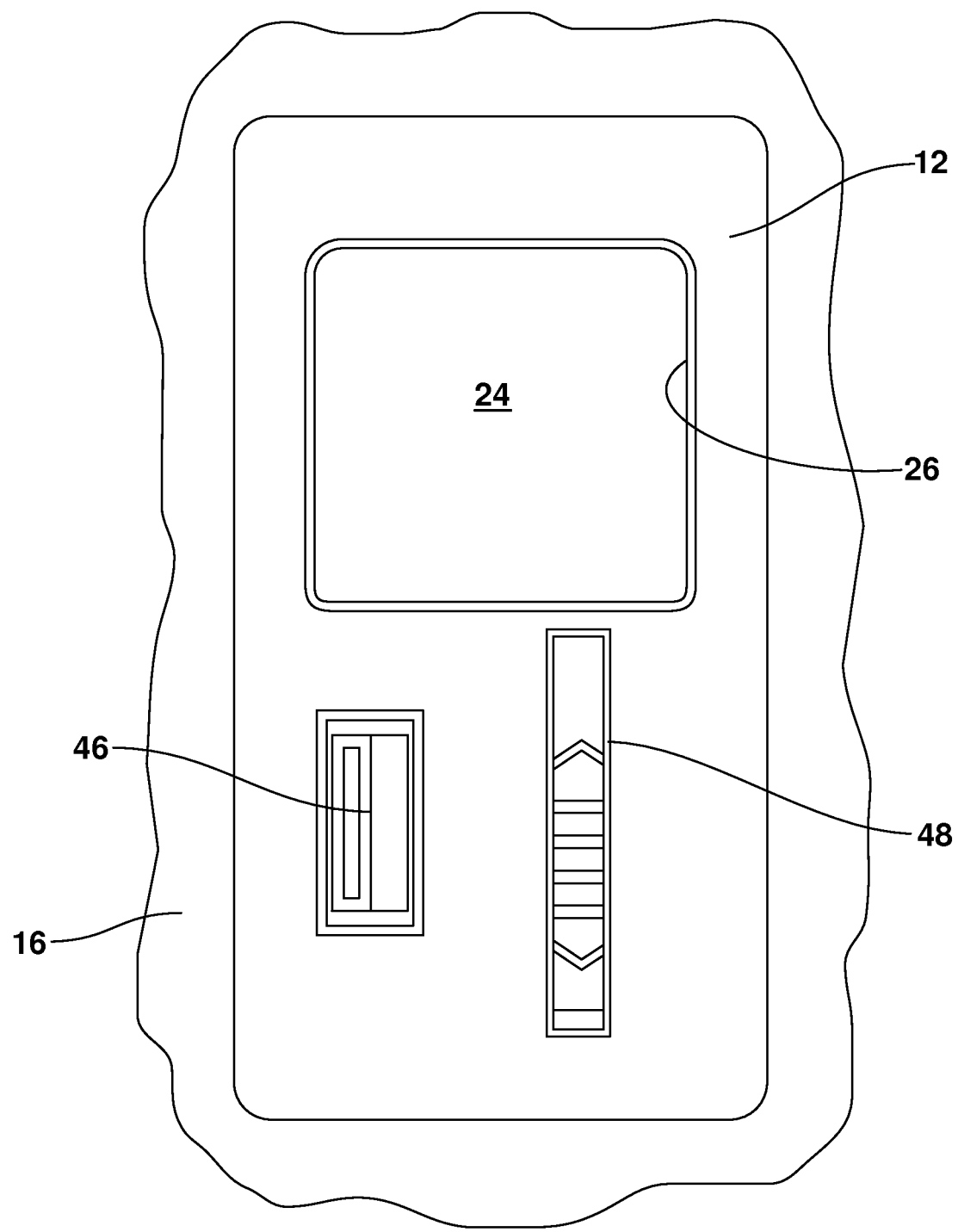
FIG. 4 is a front elevational view of the power bank charging module integrated into a trim panel of the body interior of the motor vehicle with the portable power bank withdrawn and the spring door in the closed position.

The power bank system 10 further includes a portable power bank 18 that is displaceable between a charging position within a dedicated receiver 20 of the power bank charging module 12 (see FIGS. 1 and 2) and a mobile use position withdrawn from the dedicated receiver for use outside of the motor vehicle (see FIGS. 3 and 4).

Figure 1:
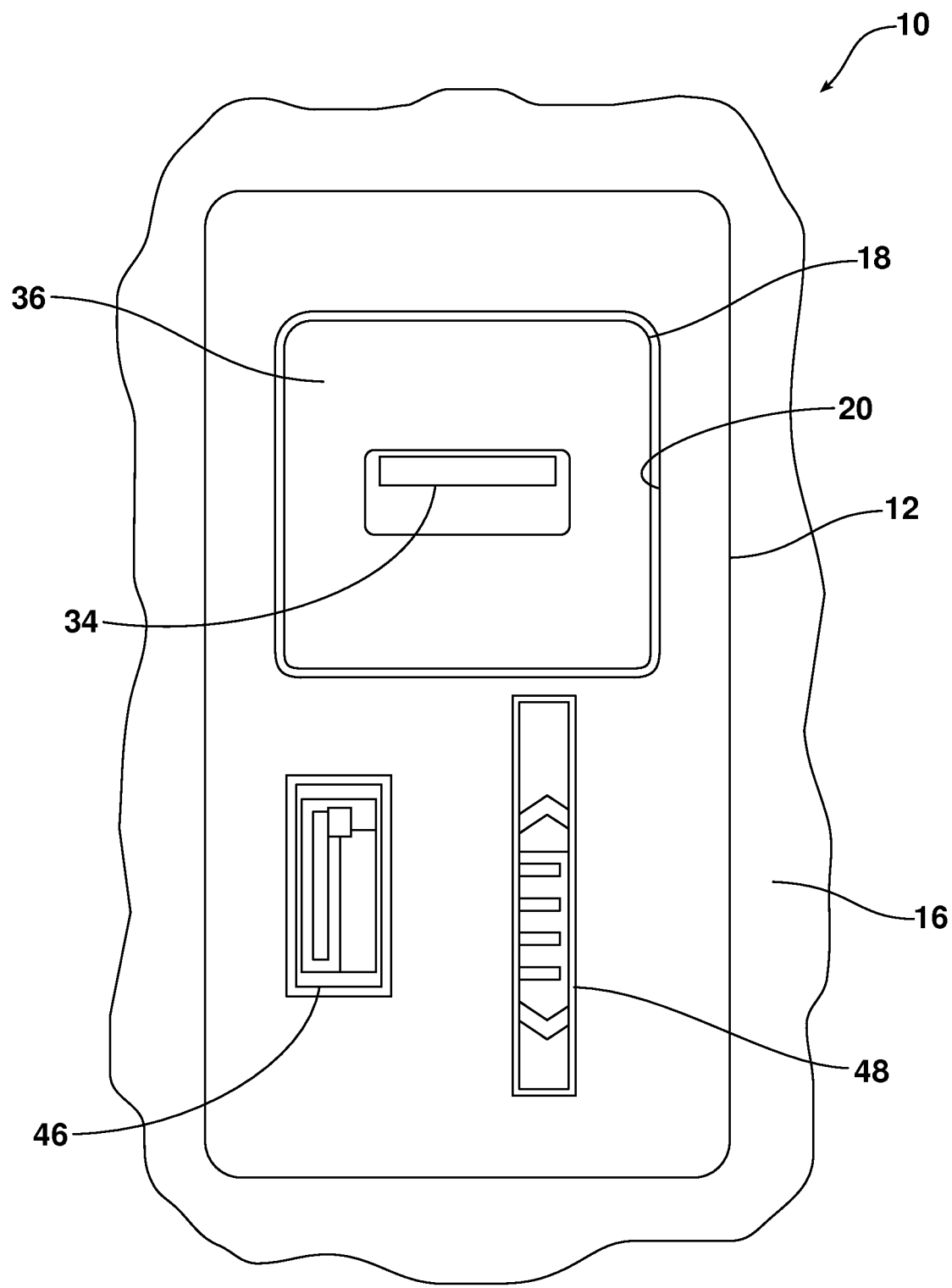
FIG. 1 is a detailed front elevational view of the power bank system illustrating the power bank charging module integrated into a trim panel of the body interior of a motor vehicle with a portable power bank held in a charging position in the dedicated receiver of the power bank charging module.

With reference to FIGS. 1 and 2, it should be appreciated that the power bank charging module 12 also includes a charge coupling 22 for charging the portable power bank 18 when the portable power bank is held in the dedicated receiver 20.

As best illustrated in FIGS. 2 and 3, the power bank charging module 12 also includes a spring loaded door 24 for closing the port or opening 26 of the dedicated receiver 20 when the portable power bank 18 has been withdrawn for use.

In one possible embodiment, the power bank charging module 12 also includes a push/push or push-to-eject mechanism 28 for ejecting the portable power bank 18 from the dedicated receiver 20 when a user desires to utilize the portable power bank to power a portable electronic device such as a music player or cell phone. Such a mechanism of this type is known in the art for use in other applications.

The portable power bank 18 includes a battery 30 held in a housing 32. A USB interface 34 is provided at a first end 36 of the housing 32 to allow connection via cable to the portable electronic device of the user. The battery 30 provides power to the portable electronic device when properly connected.

Figure 5:
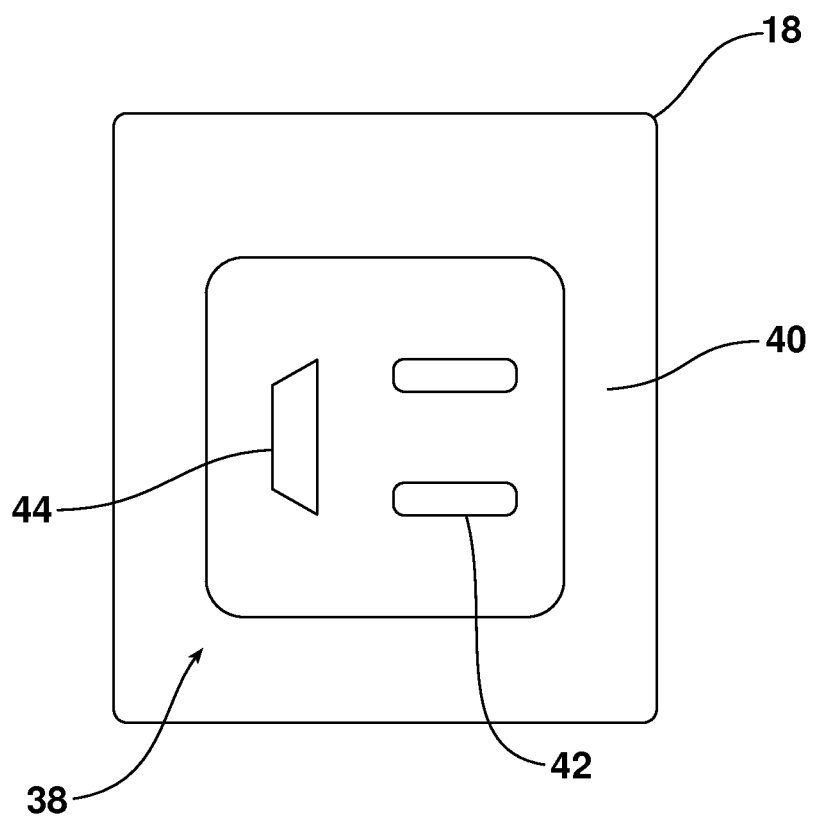
FIG. 5 is a second end view of the portable power bank illustrating the power input at the second end of the housing.

As illustrated in FIG. 5, a power input 38 is provided at a second end 40 of the housing 32. In the illustrated embodiment, that power input 38 includes a motor vehicle AC adapter 42 and a micro USB interface 44. When the portable power bank 18 is secured in the charging position within the dedicated receiver 20, it is this AC adapter 42 that operatively engages with the charge coupling device 22 of the power bank charging module 12 so as to allow for the charging of the battery 30. When the portable power bank 18 has been withdrawn from the dedicated receiver 20 for use outside the motor vehicle, the micro USB interface 44 will allow the battery 30 to be charged outside the vehicle via, for example, USB cord connection to a USB outlet of a personal computer or through another charging device.

As further illustrated in FIGS. 1 and 4, the power bank charging module 12 may also include a USB interface 46 to allow one to directly charge an electronic device such as a music player or cell phone through a USB cord connected between that device and the interface 46. In addition, the changing module 12 may also include an SD card slot 48. Advantageously, this can be done while the portable power bank 18 is simultaneously charging in the dedicated receiver 20. This synchronous charging feature further ensures that a user will have a maximum amount of operating power for the user's portable electronic device under substantially any circumstances.

As should be appreciated, the power bank system 10 described herein is characterized by a method of providing an auxiliary power source for a mobile electronic device. That method may be described as including the step of equipping a motor vehicle with a power bank charging module 12 that is integrated into a body interior of the motor vehicle. In addition, the method includes the step of charging a portable power bank 18 in a dedicated receiver 20 of the power bank charging module 12. Further, the method includes the step of allowing the portable power bank 18 to be withdrawn from the dedicated receiver 20 and used outside the motor vehicle to power the mobile electronic device of choice.

In one possible embodiment, the method further includes integrating the power bank charging module 12 into an instrument panel stack of the motor vehicle. In another possible embodiment, the method includes integrating the power bank charging module into a center console of the motor vehicle.

In summary, the power bank system 10 described herein provides a number of benefits and advantages. As should be appreciated, the system 10, including the power bank charging module 12, is fully and neatly integrated into the body interior of the motor vehicle, such as within a trim panel of the instrument panel stack or center console so as to provide an aesthetically pleasing appearance. Advantageously, the portable power bank 18 is inserted into and held in a dedicated receiver 20 where it is connected to a charge coupling 22 without the need of any cables that might become entangled with or annoy the driver of the motor vehicle.

Advantageously, the portable power bank 18 is maintained in a charged state and may easily and quickly be withdrawn from the dedicated receiver 20 by means of the push-to-eject mechanism 28 to power the mobile electronic device of the user outside of the motor vehicle for extended periods of time. When so removed, the spring loaded door 24 swings closed to keep dirt and debris from entering the dedicated receiver 20.

It should also be noted that the power bank charging module 12 also includes a USB interface 46 so that the battery of a cell phone or other electronic device may be charged simultaneously with the charging of the portable power bank 18 to thereby ensure maximum power availability for mobile operation of the electronic device of the user at all times.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A power bank system for a motor vehicle, comprising:
 a power bank charging module integrated into a body interior of said motor vehicle and including a dedicated receiver; and
 a portable power bank for powering a portable electronic device, said portable power bank being displaceable between a charging position within said dedicated receiver and a mobile use position withdrawn from said dedicated receiver.

2. The power bank system of claim 1, wherein said power bank charging module includes a charge coupling for charging said portable power bank when said portable power bank is held in said dedicated receiver.

3. The power bank system of claim 2, wherein said power bank charging module includes a spring loaded door for closing said dedicated receiver when said portable power bank is withdrawn from said dedicated receiver.

4. The power bank system of claim 3, wherein said power bank charging module includes a push-to-eject mechanism for ejecting said portable power bank from said dedicated receiver.

5. The power bank system of claim 4, wherein said portable power bank includes a battery held in a housing.

6. The power bank system of claim 5, wherein said portable power bank includes a USB interface at a first end of said housing and a power input at a second end of said housing.

7. The power bank system of claim 6, wherein said power input includes a motor vehicle AC adapter and a micro USB interface for mobile power charging.

8. The power bank system of claim 7, wherein said power bank charging module is held in a recess behind a trim panel of said motor vehicle.

9. The power bank system of claim 8, wherein said trim panel is part of an instrument panel stack of said motor vehicle.

10. The power bank system of claim 8, wherein said trim panel is part of center console of said motor vehicle.

11. The power bank system of claim 1, wherein said power bank charging module includes a push-to-eject mechanism for ejecting said portable power bank from said dedicated receiver.

12. The power bank system of claim 1, wherein said portable power bank includes a battery held in a housing.

13. The power bank system of claim 12, wherein said portable power bank includes a USB interface at a first end of said housing and a power input at a second end of said housing.

14. The power bank system of claim 13, wherein said power input includes a motor vehicle AC adapter and a micro USB interface for mobile power charging.

15. The power bank system of claim 1, wherein said power bank charging module is held in a recess behind a trim panel of said motor vehicle.

16. The power bank system of claim 15, wherein said trim panel is part of an instrument panel stack of said motor vehicle.

17. The power bank system of claim 15, wherein said trim panel is part of center console of said motor vehicle.

18. A method of providing an auxiliary power source for a mobile electronic device, comprising:
equipping a motor vehicle with a power bank charging module integrated into a body interior of said motor vehicle;
charging a portable power bank in a dedicated receiver of said power bank charging module; and
allowing said portable power bank to be withdrawn from said dedicated receiver and used outside said motor vehicle to power the mobile electronic device.

19. The method of claim 18, including integrating said power bank charging module into an instrument panel stack of said motor vehicle.

20. The method of claim 18, including integrating said power bank charging module into a center console of said motor vehicle.

* * * * *